2,258,842

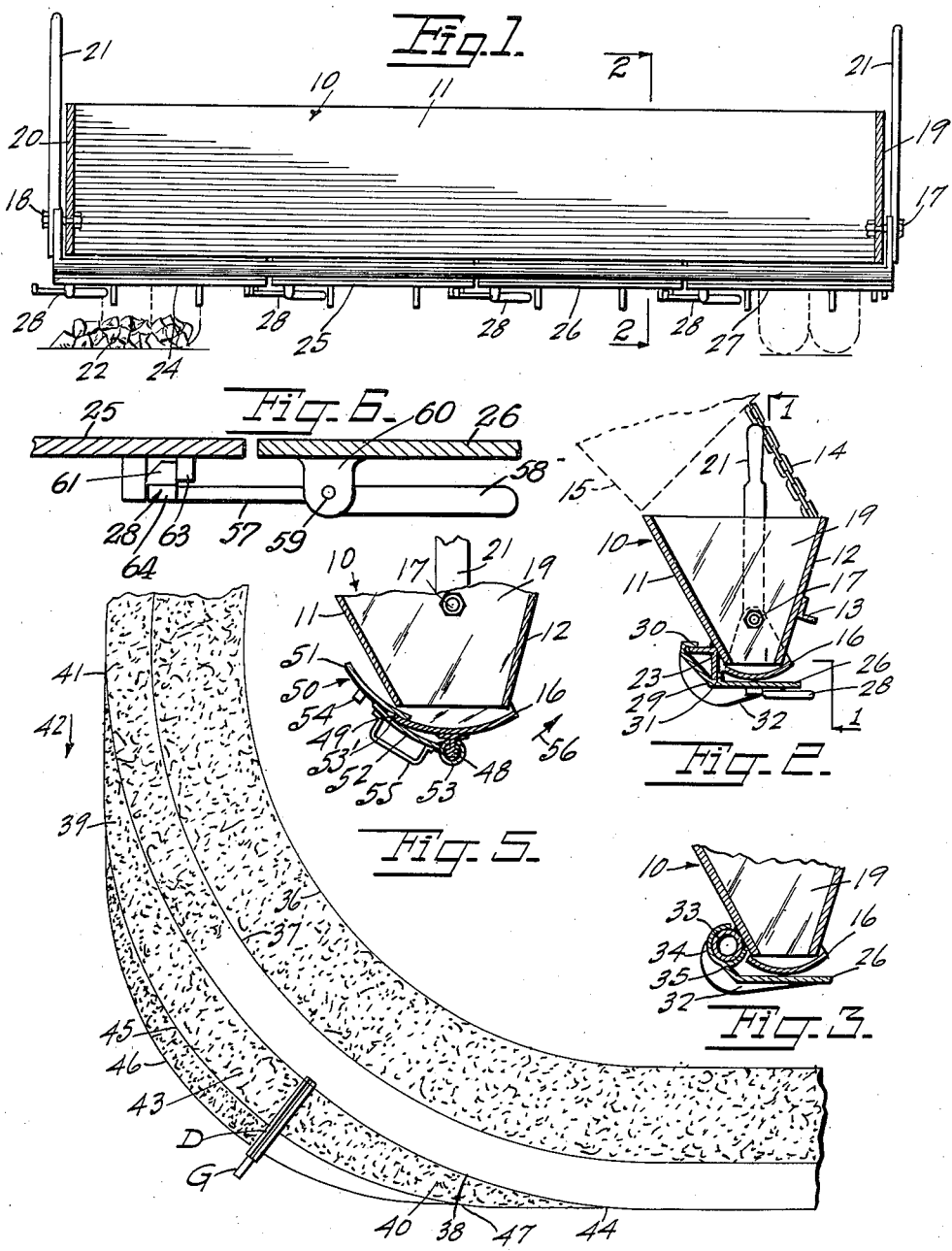
Oct. 14, 1941.   I. BROCKETT   2,258,842
ADJUSTABLE-WIDTH TAIL-GATE SPREADER
Filed Jan. 12, 1940
Inventor
Ivan Brockett
By Philip A. Friedell
Attorney Patented Oct. 14, 1941

UNITED STATES PATENT OFFICE 2,258,842

ADJUSTABLE-WIDTH TAIL-GATE SPREADER

Ivan Brockett, Hayward, Calif.

Application January 12, 1940, Serial No. 313,488

5 Claims. (Cl. 221—144)

This invention, an aggregate spreader, is designed to spread aggregates for building, rebuilding or repairing roads, and has a particular advantage over other types of spreaders in that the aggregates, in addition to being controlled as to volume of spread or distribution, is also controlled to spread over any desired width from any portion of the spreader, and this width of spread can be varied while the spreader is in operation for tapering out or tapering in to or from a widened portion of the roadway.

The conventional types of spreaders usually control only the volume of the spread, or control the volume, and control the width to predetermined dimensions and cannot be tapered at will.

The objects and advantages of this invention are as follows:

First; to provide an aggregate spreader in which the width of spread can be manually controlled at will including while the spreader is in operation for tapering the spread from zero or any intermediate width to the full width of the spreader, or in reverse.

Second; to provide a spreader as outlined which is manually adjustable to provide a uniform width of spread from any position throughout the width of the spreader.

Third; to provide a spreader as outlined in which the spreading can be manually controlled to vary the width of the spread during operation from any predetermined width through any desired increase or decrease in width.

Fourth; to provide a spreader as outlined which is economical in construction and convenient to adjust and control.

In describing the invention reference will be made to the accompanying drawing, in which:

Fig. 1 is a longitudinal sectional elevation through the invention, and is taken on line 1—1 of Fig. 2.

Fig. 2 is a section taken on line 2—2 of Fig. 1.

Fig. 3 is a transverse sectional elevation illustrating a modified form of the invention.

Fig. 4 is a diagrammatic view of a roadway and illustrating the method of distributing aggregates.

Fig. 5 is an enlarged fragmentary cross-sectional view through another modified form of the invention.

Fig. 6 is a fragmentary view showing the coupling means between the gates or extension lips.

The conventional distributor consists of a hopper 10 having front and back walls 11 and 12 suitably reinforced as indicated at 13 to prevent spreading; suspending means 14 for suspending the hopper from the tail end of a truck 15; a bottom gate 16 which is pivotally supported at 17 and 18 by the end walls 19 and 20 of the hopper and having a handle 21 at each end for manually adjusting the opening of the gate according to the thickness of the layer of aggregate 22 desired.

The invention consists in providing the distributor with means whereby the width of spread can be controlled at will, and one form of the invention consists in forming a gib 23 throughout the width of the hopper, and which gib as illustrated in Fig. 2 consists of a structural angle welded by its apex to the hopper wall, thus coincidently forming a reinforcement for the lower portion of one wall of the hopper.

Slidably mounted on this gib is a series of gates 24, 25, 26, 27, each of which is provided with combined coupling and gripping means 28, for coupling all of the gates together when desired for collective adjustment.

The coupling means consists of a latch comprising a lever having a latch portion 57 and a releasing portion 58 which coincidently functions as a counterweight to keep the latch in coupling position and being pivoted at 59 in the ears 60 which are secured to one end of each gate, such as 26, and the latch portion 57 terminates in an engaging member 61 which engages between the two lugs 62 and 63 which are secured to the other end of each gate as indicated for gate 25. The lug 62 has no function so far as the latch is concerned but provides an abutment for a hand tool, such as a hook or rod bent at the end the bent portion of which can be inserted similar to the member 61 so that the gate can be moved in either direction by pushing or pulling on the rod (not shown). By raising the lever portion 58 the adjacent gates or extension lips are uncoupled. A lug or finger 64 extends at right angles to the lever as indicated in Fig. 6 so that the latch may be released by pressing down on this finger instead of lifting on the end 58.

These gates are formed as indicated at 29 and 30 to partly encompass the legs of the angle, and a rail 31 welded or otherwise secured to the gate completes a gibway which is slidable on the gib and which fully supports the gates, and these gates are suitably reinforced as indicated at 32. The modification, Fig. 3 is similar in all respects to the distributor illustrated in Figs. 1 and 2, with the exception that a pipe 33 is substituted for the angle 23, and the gibway is formed by slotting out one side of a larger pipe to form a partially cylindrical gibway 34 slidable on the cylindrical gib 33 and with the gate welded to the element 34 as indicated at 35.

The modification Fig. 5 consists of a supporting member such as a rail 48 welded or otherwise secured to the bottom of the gate 16 to form one member of a double track, the other member being formed by the lip 49 of the hopper gate 16.

A series of auxiliary or extension lips 50 are substituted for the gates 24 to 27, and each consists of the lip extension 51, bridge plate 52 and gibway 53 shown as a slotted pipe similar to the pipe 34, Fig. 3, this gibway being slidable on the rail 48 and having one edge of the bridge plate 52 welded or otherwise affixed thereto while the other edge of the bridge plate is welded or otherwise affixed to the underside of the lip extension 51 in such manner as to form a slideway 53¹ between the overlapping members 52 and 51, these extension lips thus being slidably supported by the lip 49 of the gate 16 and by the rail 48, and having suitable coupling means 54 for releasably coupling the series of extension lips for simultaneous adjustment along the bottom gate 16. Suitable handles 55 are provided for manual adjustment of the extension lips.

As will be noted, when the gate 16 is swung about its pivot 17 in the direction of the arrow 56 to full open or any intermediate position, the extension lips maintain closure of the bottom of the hopper throughout their extent, although operating directly with the gate 16.

The method of operation is as follows: Strips of aggregates are deposited full width as indicated between the lines 36 and 37 by removing all of the gates 24 to 27, or all of the lip extensions 50, and opening the main gate 16 to provide the required flow for the desired depth of deposit. When a narrower strip is to be laid, as between lines 37 and 38, the gates 24 to 27, or the lip extensions 50 are adjusted by removal or partial withdrawal according to the width of strip desired. The distribution can be conducted from any portion of the hopper by shifting the gates or lip extensions to form the opening or openings at the desired location or locations.

When a point is reached where the road widens or narrows, as at 39 and 40, the couplings 28 or 54 are disconnected between two gates or lip extensions and the distributor is transported with the contiguous edges of the uncoupled gates or lips over the edge line 41, and as the truck moves the distributor in the direction of the arrow 42, the remaining gates or lips which are coupled together are manually drawn out to gradually increase the width of the spread until the maximum offset is reached, after which the gates are slid back starting at this point of maximum offset 43, in accordance with the convergence of the road and will be fully closed at the fade-out point 44.

The distributor is illustrated diagrammatically at D with the gates G partly withdrawn and distributing aggregates in the converging portion of the offset between lines 45 and 46, having passed the point of maximum offset, therefore the gates are next pushed back toward the closing point and will be fully closed at point 47.

Thus the distribution of aggregates is accurately controlled for any uniform width, or for any gradual or abrupt increase or decrease in width while the distributor is in operation.

It will be understood that variations in construction and arrangement of parts, which variations are consistent with the appended claims, may be resorted to without detracting from the spirit or scope of the invention, or sacrificing any of the advantages thereof.

I claim:

1. In an aggregate distributor having a hopper having a continuous discharge opening extending throughout the width thereof and a gate therefor for controlling the volume of aggregates distributed through said opening, and means related to said gate and associated with said hopper and manually adjustable throughout the length thereof for limiting distribution of aggregate to any selected portion along the width of the discharge opening; said means comprising a gib extending throughout the width of the gate; lip extensions slidably supported on said gib and projecting beyond the lip of said gate and manually releasable coupling means for locking said extensions in abutting series, separation of any two lip extensions providing a passage for aggregates passed by said gate and of a width corresponding to the degree of separation between the extensions.

2. In an aggregate distributor having a hopper having a continuous discharge opening extending throughout the width thereof and a gate therefor for controlling the volume of aggregates distributed through said opening, and means related to said gate and associated with said hopper and manually adjustable throughout the length thereof for limiting distribution of aggregate to any selected portion along the width of the discharge opening; said means comprises a gib extending throughout the width of the gate; a series of lip extensions slidably supported on said gib and projecting beyond the lip of said gate; separation of any two lip extensions providing a passage for aggregates passed by said gate and of a width corresponding to the degree of separation between the extensions; and coupling means for coupling any selected series of lip extensions in abutting series for manually adjusting a series of lip extensions in combination during operation of the distributor, and being manually releasable for removal or for independent adjustment of the respective lip extensions.

3. An aggregates distributor comprising a hopper having an open bottom and a gate controlling said open bottom for relative volume of discharge; a series of lip extensions slidably mounted on said gate and slidable longitudinally of the discharge opening of said hopper and manually adjustable therealong and removable to provide an opening of any desired width in any position throughout the width of said hopper and maintaining said aggregates against discharge to a road surface except through openings formed by adjustment or removal of one or more of said lip extensions, and coupling means manually releasable for coupling any desired number of extensions in abutting series.

4. An aggregate distributor comprising; a hopper having an opening in the lower portion thereof; a gate extending throughout the width of said hopper and adjustable relative to said opening to control the rate of discharge of aggregates from said hopper and having a lip; a series of lip extensions slidably mounted on said gate and slidable longitudinally of said opening and projecting beyond said lip and forming closures for any opening formed by said gate within their limits of width; coupling means for coupling said lip extensions in abutting relation for simultaneous manual adjustment along said opening, and manually releasable for individual adjustment or removal of the respective lip extensions.

5. A hopper having a continuous discharge opening and extending throughout the width thereof; a gate cooperatively related to said opening and adjustable to limit the degree of opening uniformly throughout the width thereof, and means for manually adjusting said gate; a series of lip extensions slidably mounted on said gate and slidable longitudinally of the discharge opening of said hopper for adjustment along the width of said gate for limiting discharge from said hopper to any selected portion throughout the width of said gate; and coupling means for selectively coupling any ones of said lip extensions in abutting series, said coupling means being manually releasable to permit relative adjustment of the individual lip extensions.

IVAN BROCKETT.